Oct. 21, 1969    J. F. GARRISON    3,473,369
AIRCRAFT WEIGHT AND BALANCE SYSTEM SENSOR
Filed Aug. 9, 1966
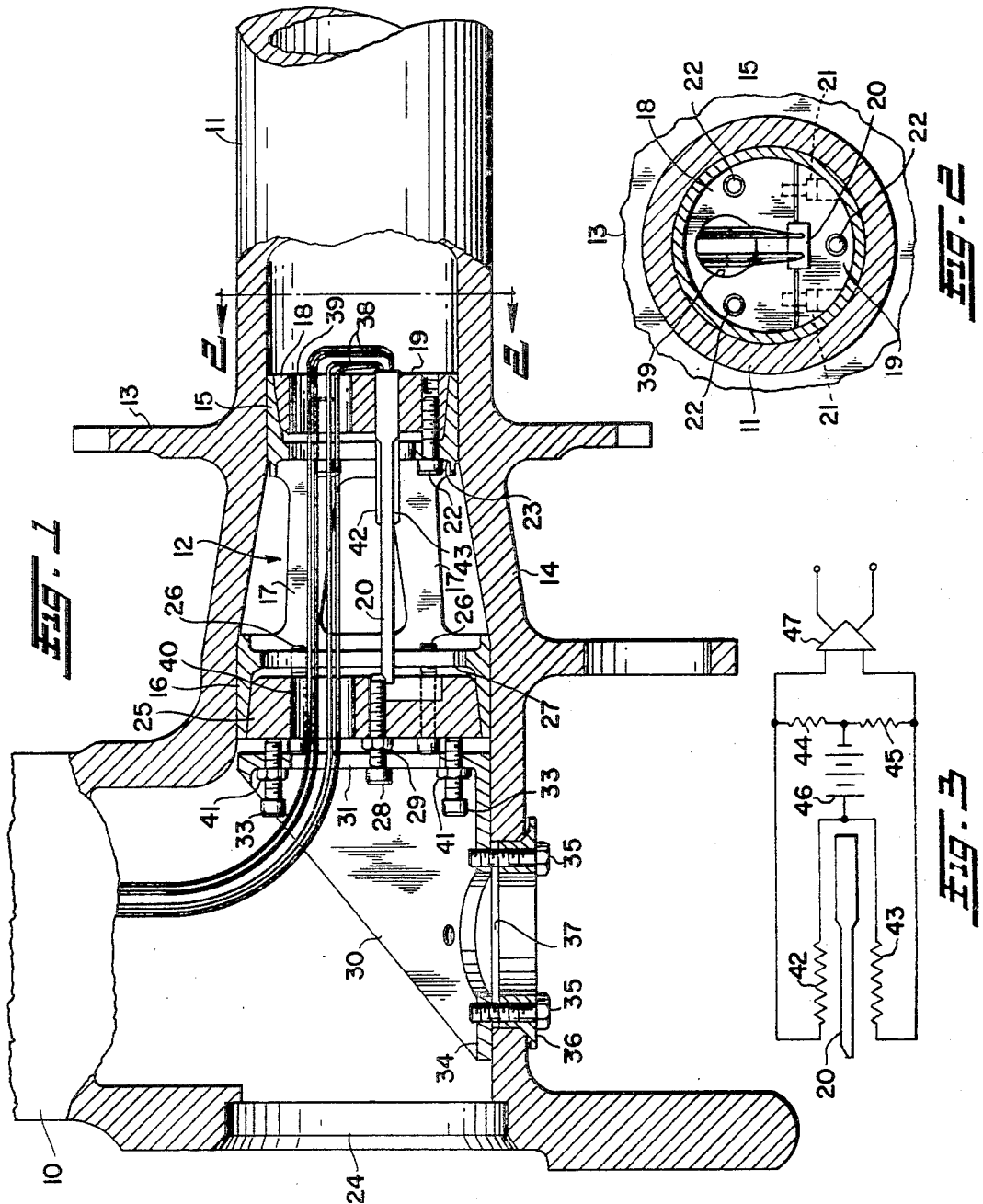
INVENTOR
JUDD F. GARRISON
BY [signature]
ATTORNEY

United States Patent Office 3,473,369
Patented Oct. 21, 1969

3,473,369
AIRCRAFT WEIGHT AND BALANCE SYSTEM SENSOR
Judd F. Garrison, Grand Rapids, Mich., assignor to Pneumo Dynamics Corporation, Cleveland, Ohio, a corporation of Delaware
Filed Aug. 9, 1966, Ser. No. 571,312
Int. Cl. G01m 1/12
U.S. Cl. 73—65          5 Claims

ABSTRACT OF THE DISCLOSURE

A sensing assembly for use in ground support structures of an aircraft for developing electrical signals proportional to the weight of the aircraft as a function of deflection of the structures consisting of a pair of radially expandable mounting members for engaging the interior surface of a hollow support structure at spaced locations therein, a precision sensor bar extending between and supported in the mounts and deflectable with relative movement of the mounts and strain gage type transducers bonded on the bar for providing an electrical signal variation.

---

This invention relates to an improved sensor assembly for use in aircraft weighing systems for indicating the grooss weight of the aircraft and the location of the center of gravity.

While the advantages of having such an indication of weight and balance available in the aircraft have been appreciated for quite some time and certain systems have been proposed for the purpose, the use of these has been confined substantially if not entirely to development programs. All of the systems on this order which have been proposed involve instrumentation of the landing gear of the aircraft, and it is believed that the system development and use has been retarded by the lack of a suitable device or assembly for the sensing of the weight on each wheel when the aircraft is on the ground. Many prior weight measuring techniques and sensors were, for example, totally inapplicable simply because they could not afford the compact ruggedness of design essentially required by the aircraft landing gear environment, and other sensors while adequately durable were not operationally satisfactory by reason of poor quality in their relation or association with the gear by which the particular weight variable condition of the gear is sensed. This last relationship can be influenced by placement, that is, the location of the sensor and its orientation with respect to the gear or a particular part thereof, and the manner in which the element or elements which respond to the weight variable characteristic are operatively connected to the gear, and these factors require proper appreciation and understanding of aircraft landing gear operating characteristics.

It is a primary object of the present invention to provide a new sensing assembly which meets the noted desiderata and thereby can be utilized for equipping an aircraft with a practical and effective weight and balance system, it being understood in the art that the center of gravity is located in terms of percentage of the mean aerodynamic chord by computation from the weight indicating responses at nose and main gear.

Another object is to provide such a weight and balance sensor in which transducer means is employed in a particular configuration which determines and provides the reaction thereof to the weight on the gear with high accuracy and reliability under the usual environments experienced in aircraft operation.

It is also an object of this invention to provide such a sensor which is economical, compact and readily installable in all types of aircraft, with installation possible in existing craft as well as those newly constructed.

It is a further object of the invention to provide an aircraft weight and balance system sensor in which transducer means is caused to react to deflection of a section of the landing gear of the aircraft between points thereon at a predetermined spacing as a result of weight load on the gear.

It is also an object to provide such a sensor in which the transducer is bonded to a support bar mounted to extend between spaced points on the gear, with mechanical connections thereto and the bar thereby serving to provide the transducer reaction to deflection of such section of the gear.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a fragmented elevation, partly in section, of an aircraft landing gear equipped with a weight and balance system sensor in accordance with the present invention;

FIG. 2 is a transverse sectional view taken on the plane 2—2 in FIG. 1; and

FIG. 3 schematically illustrates the electrical circuit used in the sensor.

Referring now to the drawing in detail, the landing gear section shown and comprising a vertical oleo strut portion 10 and a cantilever axle continuation 11 is intended to represent a typical gear environment for the new sensing assembly designated generally by reference numeral 12. It may be pointed out that the axle of this gear has an inboard flange 13, and it will be understood in the art that the axle beyond this flange will support the wheel bearing, wheel and tire assembly, which is fully conventional and has been omitted from the illustration for convenience. As will become more apparent hereinbelow, it will also be understood that the sensor of the invention is not limited to use with this particular type of gear.

The new sensor is in the illustrative embodiment housed within a tapered inner portion 14 of the hollow axle 11 and extends roughly longitudinally from the plane of the inboard flange 13 to the intersection of the axle with the vertical oleo strut. Such sensor comprises a first expanding sleeve or internal diameter collet section 15 at the outboard end with its outer surface engaging the axle and its inner surface being conical and of outwardly increasing diameter as shown. A second expanding sleeve or internal diameter collet section 16 is provided at the other end of the sensor assembly, with the outer surface thereof similarly engaging the interior of the axle and the inner surface being conical, but with the diameter of the latter increasing in the inboard direction. These two collet sections are shown united by a plurality of connector arms 17 with which they are integral, so that a single piece assembly is provided which facilitates installation. Whether such integral design is used or the collets are separate, it will be understood that they will be spaced apart along the length of the axle 11.

The outboard collet 15 receives an expander cone which is constituted of an upper major section 18 and a lower chordal section 19 as shown most clearly in FIG. 2. Center portions of the opposed surfaces of the two sections 18 and 19 are oppositely relieved to define together a generally rectangular opening extending through the length of the cone and one end of a support bar 20 is received in such opening. The bar is clamped in place by cap screws 21 passing through the lower and into the upper cone section to fasten and draw the two together against the end of the bar. Three more cap screws 22 extend parallel to the axis through a radial flange portion 23 at the inner end of the collet 15 and into the expander cone, with the heads at the inner end of the collet and therefore accessible through the back strut opening 24 in line with the axle.

Another expander cone 25 is disposed within the outward facing inner collet 16 and is attached by a plurality of cap screws 26 passing from the inner end outwardly through the cone and into radial flange 27 of the collet 16. Both collets are preferably provided with longitudinal slits, and it will of course be appreciated that the cones are actuated by the cap screws to force the collets to expand outwardly tightly against the interior surface of the axle.

A further screw 28 is threaded through the inboard expander cone into engagement with the inner end of the support bar 20, with the latter being beveled and the inner end of the screw conical as shown for cone and ramp engagement of these two elements. The resulting attachment of such other end of the bar 20 is preferred for the purpose of providing a preload on the bar which is adjustable by actuating the screw 28. The bar will be seen to be parallel to the axis of the axle 11 and the advance of the screw on the end of the bar will produce a predetermined degree of downward deflection of the latter, with this deflection being in a direction thus to be relieved by weight on the axle. The adjusting screw 28 is locked by a jam nut 29.

A back-up and locking fixture 30 is also shown in this assembly and comprises a transverse ring portion 31 through which cap screws 32 are threaded into abutting engagement with the inner face of the expander cone 25 and locked by jam nuts 33. The fixture has a bottom portion 34 which is fastened to the strut bottom wall by vertical cap screws 35 carried by a collar 36 in the bottom opening 37, and it will be seen that this fixture thus provides positive restraint against any inward shift tendency of the sensor, the outwardly decreasing taper of the inner surface of the axle section 14 insuring against any outward shift.

It will be also seen that the complete assembly can be readily installed in the gear, in this case, through the back opening 24. The operation involves simply the initial insertion of the body portion including the collets 15 and 16 to the inner position shown, with only the outboard expander cone 18, 19 and bar 20 assembled therewith, and the cap screws 22 are then actuated firmly to lock the outboard collet in place. As will be more fully described below, four electric wires 38 extend from the outer end of the bar 20 and these are brought forwardly through an opening 39 in the expander cone section 18. The inboard cone 25 has a similar opening 40, and this cone 25 is inserted within the inboard collet 16 after leading the electric wires therethrough for continued passage upwardly within the strut as shown. The inboard collet 16 is then tightened by actuation of the cap screws 26, the adjusting screw 28 is actuated to give the desired preloading, the fixture 30 is inserted and locked in place by the bottom screws 35, and the further cap screws 33 carried by the fixture are threaded into the abutting engagement with the cone 25 and locked by the jam nuts 41. The usual closure plate, not shown, is then applied to the opening 24.

The bar 20 supports first and second transducers 42 and 43 respectively on the upper and lower surfaces thereof, and these are preferably solid semi-conductor strips bonded to the bar surfaces. The strips may, for example, be monocrystalline silicon, an available piezorestive material having extremely high accuracy in exhibiting a change of resistance as a result of tension and compression, and the bonding is preferably accomplished by glass encapsulation. These elements are known per se; they are oriented to extend correspondingly as the bar and it will be apparent that any deflection of the bar produces tension in one and compression in the other depending on the direction of such deflection. With the bar preloaded in the manner earlier described, the weight loading of the gear will of course proportionately relieve such preload, with the resulting signal generation and use thereof the same but simply in the direction of relief rather than load.

As shown in FIG. 3, the transducers 42 and 43 associated with the bar 20 are connected with additional resistance elements 44 and 45 to form a bridge circuit energized by a source 46 and having its output applied to an amplifier 47. The systems previously proposed for aircraft weighing as discussed utilize a sensing assembly in each landing gear, and the signals therefrom are amplified, electrically summed, converted from an analog to a digital signal and this total signal is displayed on a digital readout. For the center of gravity computation, for a typical aircraft having a nose and two main gear, the signal from the nose gear is multiplied in a computer by a constant representing the distance between the main gear and nose wheel and the product is divided by the measured gross weight. The output of this computer is a signal which represents the center of gravity displayed as a percent of the mean aerodynamic chord.

Briefly, then, the invention will be seen to comprise a transducer supporting bar arranged to extend along a section of the gear and having its ends anchored at points spaced a predetermined distance apart on the section, whereby the deflection of this section relatively at such points is transmitted through the bar to the transducer means. The latter thereby reacts to the deflection and produces a proportionate signal for circuit application as disclosed. In the case of an internal installation, for example, inside an axle as shown, the mounting employs sleeves locked by expansion, and the ease of this type installation is obvious. Although the bar should be oriented to extend along the length of the gear section, it is not essential to operation that an internal mounting be employed and, with minor change in the mounting fixtures, the bar transducer unit can be applied exteriorly with similar reaction to the deflection of the axle. In a bogie type of gear, the bogie beam experiences comparable deflection and the sensor can be applied as well to this member.

As earlier indicated, other specific transducer forms may be utilized in addition to the silicon bars, and the association thereof with the support bar can also be varied as long as the placement provides the desired monitoring of bar deflection. It is preferred that the transducer means be arranged to respond to both tension and compression as disclosed for enhanced signal effect.

Other modes of applying the principle of the invention may be employed, change being made as regards the details described, provided the features stated in any of the following claims or the equivalent of such be employed.

I, therefore, particularly point out and distinctly claim as my invention:

1. In combination with an aircraft landing gear having a section which experiences deflection proportional to weight load thereon in ground support of the aircraft, a weight sensing assembly associated with such section of the gear comprising an elongated support of predetermined length, transducer means mounted on an intermediate portion of said support for developing a variable electrical parameter as a result of and proportionate to deflection thereof, and mounting means for mechanically anchoring the ends of said support firmly to said section of the landing gear respectively at longitudinally spaced points thereon, said mounting means comprising radially expandable means for engaging the inner surface of a hollow horizontal section of the landing gear, the support being in spaced relation to the section, whereby deflection of the gear section is transmitted through the support to and monitored by the transducer means to produce a weight sensing signal.

2. In combination with an aircraft landing gear having a section which experiences deflection proportional to weight load thereon in ground support of the aircraft, a weight sensing assembly associated with such section of the gear comprising first and second mounting means rigidly attached to the section of the aircraft at longitudinally spaced locations thereon, said mounting means thereby experiencing relative displacement upon deflection of the section, first and second supports attached to said first and second mounting means respectively, and in spaced relation to the section, said supports comprising elongate members extending between said mounting means to a common longitudinal location and transducer means associated with said first and second supports for developing an electrical signal proportional to the relative displacement of said mounting means and thus of the deflection of the gear section to produce a weight sensing signal.

3. In combination with an aircraft landing gear having a section which experiences deflection proportional to weight load thereon in ground support of the aircraft, a weight sensing assembly associated with such section of the gear comprising an elongated support of predetermined length, transducer means mounted on an intermediate portion of said support for developing a variable electrical parameter as a result of and proportionate to deflection thereof, and mounting means for mechanically anchoring the ends of said support firmly to said section of the landing gear respectively at longitudinally spaced points thereon, said mounting means comprising axially spaced expansion collets which are tightened transversely against the interior of the gear section and maintain the support in longitudinal extending relation therebetween, the support being in spaced relation to the section, whereby deflection of the gear section is transmitted through the support to and monitored by the transducer means to produce a weight sensing signal.

4. The combination set forth in claim 1, wherein the transducer means comprises a strain gage bonded to the support.

5. The combination set forth in claim 1, wherein the transducer means comprises a pair of bonded strain gages, with one arranged to sense tension and the other compression in the support, and a bridge circuit in which said gages are connected as separate legs thereof.

References Cited

UNITED STATES PATENTS

| | | | |
|---|---|---|---|
| 2,550,964 | 5/1951 | Brookes | 73—151 |
| 2,587,628 | 3/1952 | King | 73—11 |
| 2,795,134 | 6/1957 | Weber et al. | 73—141 |
| 3,102,420 | 9/1963 | Mason | 73—88.5 |
| 3,194,058 | 7/1965 | Kurkjian | 73—65 |
| 3,273,382 | 9/1966 | Fonash | 73—12 |
| 3,327,270 | 6/1967 | Garrison | 73—88.5 |

RICHARD C. QUEISSER, Primary Examiner

ROBERT S. SALZMAN, Assistant Examiner